Dec. 20, 1955 G. S. CHERNIAK 2,727,387
TRANSDUCER
Filed Dec. 22, 1952
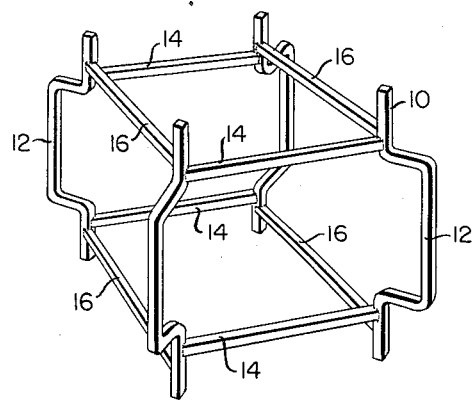
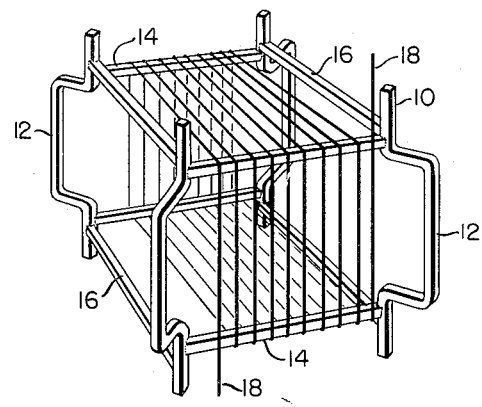
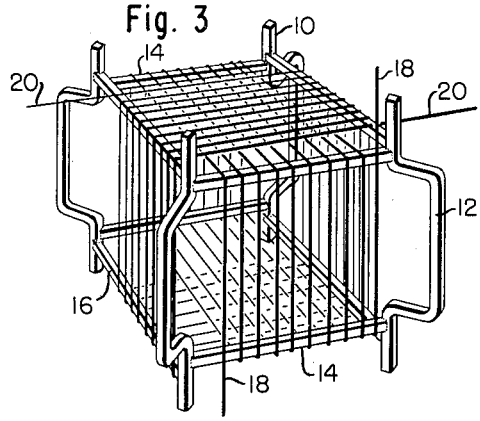
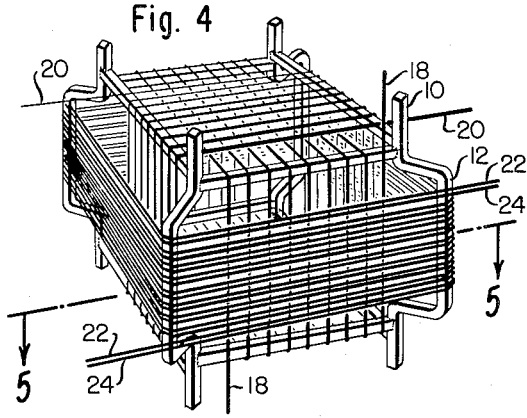
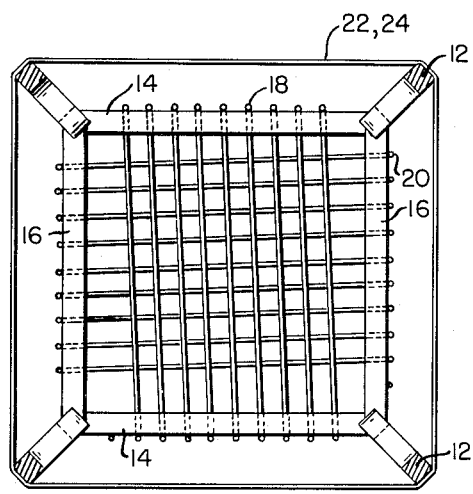
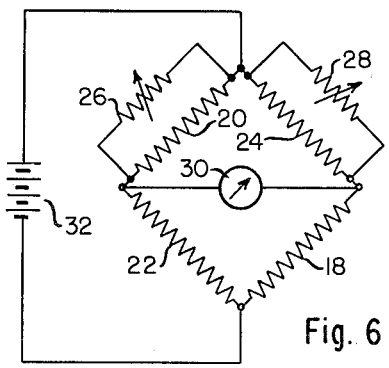
*INVENTOR.*
GEORGE S. CHERNIAK
BY
Kenway, Jenney, Witter & Hildreth
ATTORNEYS

United States Patent Office 2,727,387
Patented Dec. 20, 1955

2,727,387

TRANSDUCER

George S. Cherniak, Newton, Mass., assignor to Control Engineering Corporation, Norwood, Mass., a corporation of Massachusetts Application December 22, 1952, Serial No. 327,391

7 Claims. (Cl. 73—141)

My invention relates to force transducers of the strain gauge type wherein the changes in resistance exhibited by windings of strain-sensitive wire are amplified and used to operate measuring instruments which indicate the extent of the forces acting on the windings. Transducers of this general description are well-known in the art and have been used successfully to measure pressure, acceleration, and both compressive and tensile loads.

The primary object of my invention is to increase the amplitude of the signal emanating from a strain gauge transducer and thereby facilitate accurate measurement.

Another important object of the invention is to organize a strain gauge transducer in such fashion that it may very easily be encapsulated or otherwise coupled to load transmitting devices as a compact, balanced, self-sustaining unit, thereby eliminating the necessity for complex and expensive auxiliary supporting devices.

An important feature of my invention resides in a cage frame of skeletal construction adapted to receive and support four strain responsive windings so arranged as to permit their interconnection as the four legs of a Wheatstone bridge.

Another feature of the invention consists in a skeletal support for a plurality of strain responsive windings, provided with integral legs projecting in opposite directions to serve as load receiving members and also to space the windings on their supports as well as to provide balanced support for the transducer as a unit.

An important advantage resulting from the use of a transducer constructed in accordance with my invention is the fact that it may be inserted in a suitable metal casing and coupled to a load transmitting diaphragm, all without the necessity for additional securing or supporting means.

These and other objects and features of the invention, together with their incident advantages, will be more readily understood and appreciated from the following detailed description of a preferred embodiment thereof selected for purposes of illustration and shown in the accompanying drawing, in which:

Figs. 1–4 are views in perspective showing the skeletal frame and the progressive steps involved in applying the successive strain responsive windings, Fig. 5 is a view in cross-section along the line 5—5 of Fig. 4, and Fig. 6 is a circuit diagram showing schematically the connection of the windings as a Wheatstone bridge.

As best shown in Fig. 1 the transducer is organized about a skeletal cage frame preferably constructed of rods of spring steel and including four corner supports 10 each of which is provided with an outwardly offset intermediate portion 12. Four parallel cross-ties 14 are welded or otherwise secured to the corner supports 10 relatively close to the outwardly offset portions 12, and four similar cross-ties 16 set at right angles to the cross-ties 14 complete the formation of a hexahedral skeletal cage frame. The cross-ties 16 are secured to the corner supports 10 nearer the ends thereof than the cross-ties 14, but the extended ends of the corner supports 10 form outwardly projecting legs which extend in opposite directions, That is to say, four of the legs extend upwardly as shown in Fig. 1 and the other four legs extend downwardly.

In Fig. 2 a winding 18 of strain responsive wire is shown as being wound about the four cross-ties 14, while in Fig. 3 a second winding of strain responsive wire 20 is shown being wound about the four cross-ties 16. Consequently the axis of the winding 18 is at right angles to the axis of the winding 20. The cross-ties 14 and 16 are so arranged that the two windings do not touch each other, the first winding 18 being entirely within the winding 20. In Fig. 4 two windings 22 and 24 of strain responsive wire are shown as being wound about the outwardly offset portions 12 of the corner supports 10, and it will be evident that the common axis of the windings 22 and 24 is normal to both axes of the windings 18 and 20. This appears also in Fig. 5 wherein the axis of the winding 18 runs transversely across the drawing, the axis of the winding 20 runs longitudinally of the drawing and the axis of the winding 22 and 24 is perpendicular to the plan of the drawing. All the windings are preferably tensioned so that they are pre-loaded.

As shown in Fig. 6 the four windings 18, 20, 22 and 24 are interconnected to form a Wheatstone bridge in which the winding 18 is placed opposite the winding 20 and the winding 22 is placed opposite the winding 24. In order to provide means for bringing the bridge into balance the windings 20 and 24 are shown as shunted by variable resistors 26 and 28 respectively. A battery 32 is connected across the bridge, and a meter 30 is connected across the output of the bridge in customary fashion. It is to be noted, however, that the circuit diagram is merely exemplary and that the transducer is capable of use with conventional amplifiers, recorders and the like.

The action of the transducer may first be considered by imagining that the lower legs of the frame rest on a firm support while pressure is applied to the upper four legs as by a suitable weight or other loading device. The four corner supports will bow outwardly in response to the applied stress, thus shortening the distance between the upper and lower cross-ties 14 and 16. Consequently the windings 18 and 20 will be relaxed and shortened and the resistance offered by these windings will consequently decrease. The same action of the frame will cause a mutual separation of the outwardly offset portions 12 of the corner supports 10, and the result will be that both windings 22 and 24 are tensioned, are increased in length, and therefore exhibit increased resistance. By inspection of Fig. 6 it will be seen that the effect of the changes in resistance of all four linings is cumulative and the bridge will reflect this additive effect. The action of the transducer in response to tensile loads is just the opposite. The resistance of the windings 18 and 20 is increased while the resistance of the windings 22 and 24 decrease, and the bridge is imbalanced in the opposite direction.

Strain gauge transducers of conventional design include at the most two windings and must be coupled with other resistors in order to form a Wheatstone bridge, and the other resistors necessary to form the bridge exert no beneficial effect. As the result of including in the transducer four windings all of which respond to loads, the signal generated is considerably greater than is otherwise possible. Since the deflection of the bridge is proportionately greater in terms of the applied load, it follows that increased accuracy of measurement is obtained.

It should also be pointed out that the form of the cage frame provides a compact balanced unit. The unit may be placed on a flat surface where it will support itself on the lower four legs. Consequently it may easily be slipped into a suitable capsule or casing with four of the legs resting upon the bottom and a diaphragm, plunger, or other load applying device dropped in the casing to rest on the upwardly projecting four legs. Of course, various forms of anchors and supports may be secured to the four sets of legs in order to provide for the application of tensile loads.

While I have described in detail a transducer organized about a cage frame of hexahedral form, those skilled in the art will readily appreciate that other forms may be utilized. The dimensions and material of the corner supports and cross-ties of the frame will depend upon the use for which the transducer is intended, in terms of magnitude of the loads, frequency, etc. Also, while I have shown the windings about the offset portion 12 as duplex in nature, it is equally possible to use double linings on either of the sets of cross-ties 14 or 16, without departing from the spirit of the invention.

Having now disclosed my invention, what I claim as new and desire to secure by Letters Patent of the United States is:

1. A transducer comprising four corner supports having offset intermediate portions, a first set of four parallel cross-ties joining opposed pairs of said corner supports, a second set of four cross-ties joining opposed pairs of said corner supports, each of the second set of cross-ties being normal to the first set and spaced closer to the ends of the corner supports than the first set, a first strain-sensitive winding disposed about the first set of cross-ties, a second strain-sensitive winding disposed about the second set of cross-ties, and two strain-sensitive windings disposed about the intermediate offset portions of said corner supports.

2. A transducer comprising four corner supports having offset intermediate portions, first and second strain-sensitive windings wound about said offset portions, a first set of cross-ties joining opposed pairs of said corner supports, said first set of cross-ties including at least two parallel ties which define a plane transverse to the normal of the corner supports, a third strain-sensitive winding disposed about said first set of cross-ties, a second set of cross-ties being normal to the first set of cross-ties and joining opposed pairs of said corner supports, said second set of cross-ties including at least two ties which define a plane transverse to the normal of the corner supports, and a fourth strain-sensitive winding disposed about the second set of cross-ties.

3. A transducer comprising a first set of four parallel corner supports, a second set of four parallel supports joining opposed pairs of said first set of supports, a third set of four parallel supports disposed normal to said second set of supports and joining opposed pairs of said first set of supports, strain-sensitive windings wound about each set of parallel supports, one of said windings being formed of two coils.

4. A transducer as defined in claim 3 further characterized by a plurality of outwardly extending load receiving legs integrally formed with the set of supports about which the two coils are wound.

5. A transducer as defined in claim 3 further characterized by said coils and other windings being connected as four legs of a Wheatstone bridge.

6. A transducer comprising a first set of parallel corner supports, a second set of supports perpendicular to and joining said first set of supports, said second set of supports including two parallel supports defining a plane transverse to the normal of the first set of supports, a third set of parallel supports transverse to said second set of supports and joining said first set of supports, said third set of supports including two parallel supports defining a plane transverse to the normal of the first set of supports, a pair of strain-sensitive windings wound about one set of supports, and strain sensitive windings wound about the other sets of said supports.

7. A transducer comprising a skeletal frame composed of three mutually perpendicular sets of four parallel supports connected to outline an enclosure, two strain sensitive windings wound about one set of supports, and strain sensitive windings wound about each of the other sets of supports.

References Cited in the file of this patent
UNITED STATES PATENTS

| | | |
|---|---|---|
| 2,393,714 | Simmons, Jr. | Jan. 29, 1946 |
| 2,435,231 | McPherson | Feb. 3, 1948 |
| 2,472,045 | Gibbons | May 31, 1949 |
| 2,499,033 | Oberholtzer | Feb. 28, 1950 |
| 2,636,964 | Lancor, Jr., et al. | Apr. 28, 1953 |